May 22, 1951 J. W. SMITH 2,553,683
MACHINE FOR LOADING CRACKERS ONTO CONVEYERS
Filed Dec. 30, 1949 6 Sheets-Sheet 1

FIG. 1

INVENTOR.
John W Smith
BY Otto A Earl
Attorney

May 22, 1951     J. W. SMITH     2,553,683
MACHINE FOR LOADING CRACKERS ONTO CONVEYERS
Filed Dec. 30, 1949     6 Sheets-Sheet 3

INVENTOR.
John W. Smith
BY
Attorney.

May 22, 1951 J. W. SMITH 2,553,683
MACHINE FOR LOADING CRACKERS ONTO CONVEYERS
Filed Dec. 30, 1949 6 Sheets-Sheet 5

INVENTOR.
John W. Smith
BY
Attorney.

May 22, 1951          J. W. SMITH          2,553,683

MACHINE FOR LOADING CRACKERS ONTO CONVEYERS

Filed Dec. 30, 1949          6 Sheets-Sheet 6

FIG. 8

INVENTOR.
John W. Smith
BY
Attorney.

Patented May 22, 1951

2,553,683

UNITED STATES PATENT OFFICE 2,553,683

MACHINE FOR LOADING CRACKERS ONTO CONVEYERS

John W. Smith, Battle Creek, Mich., assignor to Battle Creek Bread Wrapping Machine Company, Battle Creek, Mich.

Application December 30, 1949, Serial No. 136,040

17 Claims. (Cl. 214—8.5)

This invention relates to improvements in a machine for loading crackers onto a conveyer.

The principal objects of this invention are:

First, to provide a machine for separating a predetermined number of crackers from the bottoms of two stacks of crackers and moving the separated crackers transversely onto a moving conveyer with the charge of crackers from one stack being deposited on top of the charge from the other stack, the mechanism having interlocking means preventing the operation of the second charging operation unless the first charging operation is complete.

Second, to provide means for controlling the descent of a stack of crackers in a charging chute whereby the crackers are successively lowered without breaking to a transverse loading position and the crackers remaining in the chute are separated vertically from the charge being moved transversely to prevent rubbing and crumbling of the surface of the crackers.

Third, to provide gripping mechanism operated in timed relationship with an elevator to alternately grip and release crackers disposed in a vertical charging chute over the elevator to control the number of crackers which are permitted to move downwardly with the elevator.

Fourth, to provide grip opening and grip holding mechanism associated with a charging chute and a vertically reciprocating elevator and having adjustable releasing mechanism associated with the elevator whereby the gripping mechanism may be caused to close or move to gripping position at various points in the vertical travel of the elevator.

Fifth, to provide a cracker loading machine in which a plurality of loading chutes, each associated with a transverse loading bar, are reciprocated in timed relationship with the pockets of a continuously moving conveyer and in which the loading chutes are provided with grippers operated in timed relationship with vertically reciprocating elevators to lower a predetermined number of crackers to transverse loading position while supporting the remaining crackers in the chute out of contact with the charge to be loaded.

Sixth, to provide an adjustable releasing mechanism for the grip holder of a loading machine arranged to be tripped or released by a vertically reciprocating element at various predeterminable positions in the vertical movement of the element.

Other objects and advantages pertaining to the details of my invention will be apparent from a consideration of the following description and claims.

The drawings, of which there are six sheets, illustrate a preferred form of my loading mechanism.

The major components of my machine are arranged and assembled to cooperate with the loading conveyer 1 of an article wrapping or handling machine (not illustrated). The conveyer is provided with suitable chains 2 trained over a sprocket 3 and constantly driven to continuously advance the flights of crossbars 4 which form article receiving pockets 5, it being the purpose of my machine to load each of the pockets with a predetermined number of articles, such as the soda crackers illustrated at 6, without stopping the conveyer. To accomplish this purpose I have provided a support or pedestal 7 mounted on the legs 8 alongside of the conveyer and provided with cam actuating mechanism generally indicated at 9 and driven in timed relationship with the conveyer by the chain 10. The end members 11 of the pedestal form supports for the transversely spaced longitudinally extending slide rods 12 and the slide rods 12 in turn support a longitudinally reciprocable carriage generally indicated at 13. The end members 14 of the carriage are provided with transversely extending grooves 15 forming slideways for the loading slide generally indicated at 16. The end members 14 of the carriage are also provided with vertical grooves 17 (see Fig. 3) along their forward edge slidably supporting an elevator mechanism generally indicated at 18.

Figure 1:
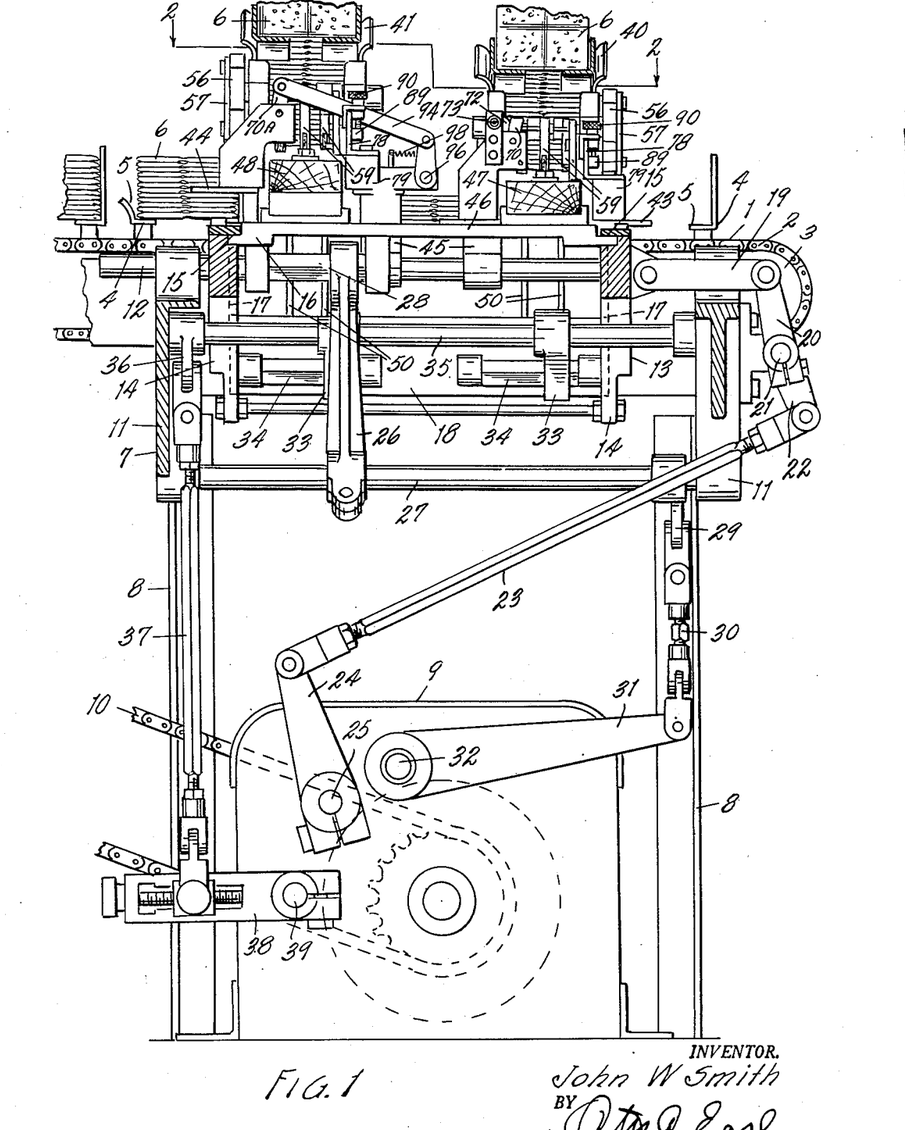
Fig. 1 is a rear elevational view, partially broken away in vertical longitudinal cross section along the plane of the line 1—1 in Fig. 3, of my loading mechanism associated with a continuously movable conveyer of a wrapping machine.

The carriage 13 is reciprocated longitudinally by means of the link 19 (see Fig. 1) connected to the crank arm 20 on the rockshaft 21. The rockshaft 21 is carried on the leading end member 11 of the pedestal and oscillated by the crank arm 22 and link 23 extending to the crank arm 24 of a rockshaft 25 in the cam drive 9. The carriage 16 is transversely reciprocated by the crank arm 26 mounted on the rockshaft 27 and having a sliding engagement with the square pushbar 28 on the carriage. The rockshaft 27 is journalled in the end members of the pedestal 7 and driven by the crank arm 29 and link 30 which extends downwardly to the crank arm 31 of a second rockshaft 32 operated by the cam drive mechanism 9. The elevator 18 is vertically reciprocated by engagement of the crank arms 33 with the square actuating bars 34 secured to the rear side of the elevator. The crank arms 33 are carried on the longitudinally extending shaft 35 journalled in the ends of the pedestal 7 and the shaft 35 is actuated by the crank arm 36 connected to the link 37 which extends downwardly to an adjustable crank arm 38 secured to a third rockshaft 39 on the cam actuating mechanism 9.

The mechanism thus far described for longitudinally reciprocating a carriage while transversely reciprocating a loading slide and vertically reciprocating an elevator on the carriage is more particularly described and claimed in my co-pending application for Loading Machine, Serial No. 746,535, filed May 7, 1947. My present invention is directed to mechanism for adapting this loading machine for use in loading soda crackers and similar fragile articles. Soda crackers in particular are characterized by being very fragile and having irregular surface bubbles which are easily broken or crumbled if the crackers are slid along the surface of each other. It is consequently essential to the successful loading of soda crackers that the crackers of a stack be separated vertically before there is any relative transverse movement between the crackers.

Figure 4:
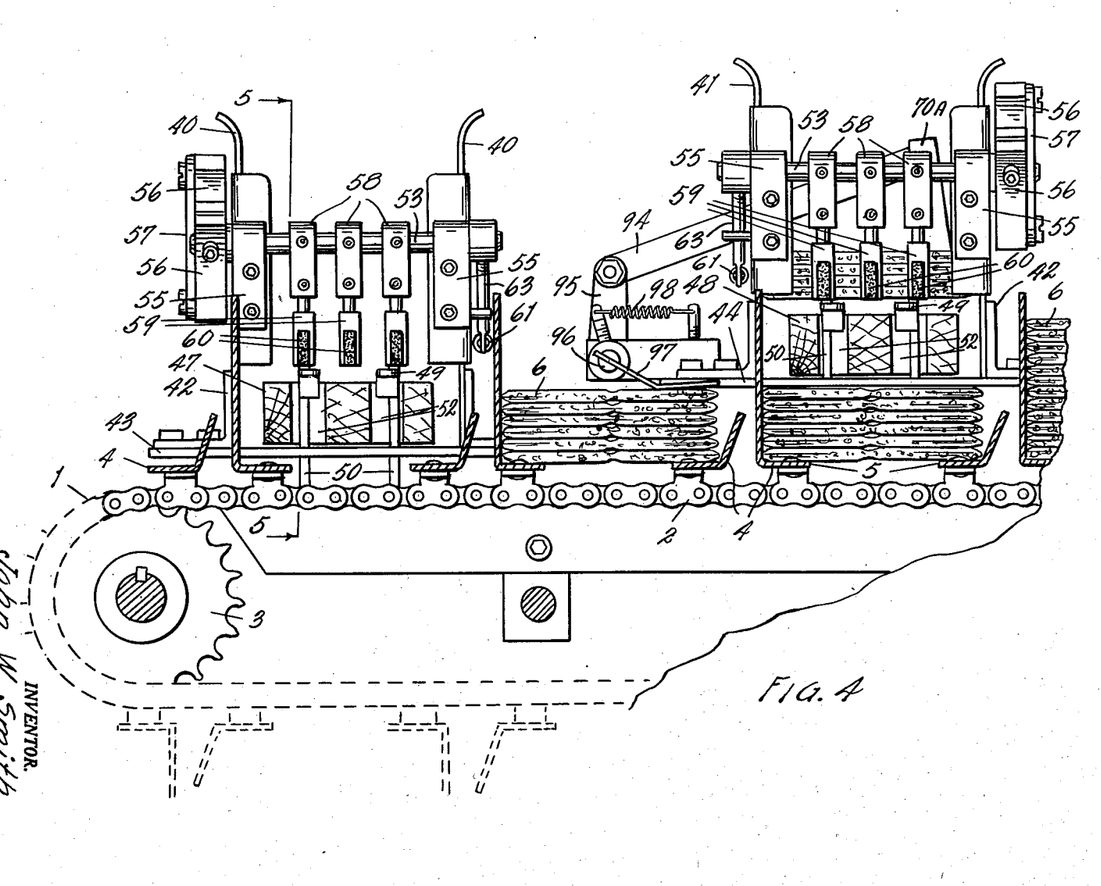
Fig. 4 is a fragmentary vertical longitudinal cross sectional view through the conveyer taken along the plane of the line 4—4 in Fig. 3.

The mechanism for conducting the crackers to a position where they may be moved transversely by the slide 16 consists first of a primary loading chute 40 and a secondary loading chute 41 disposed longitudinally of the machine alongside of the conveyer 1. The chutes 40 and 41 are supported by the brackets 42 on a primary carriage plate 43 and a secondary carriage plate 44 respectively. The carriage plates are in turn supported from the forward slidebar 12 of the carriage by the angle shaped brackets 45 and it will be noted, particularly in Figs. 1 and 4, that the primary carriage plate 43 is mounted substantially lower than the secondary carriage plate 44 and approximately level with the surface of the conveyer 1.

Figure 3:
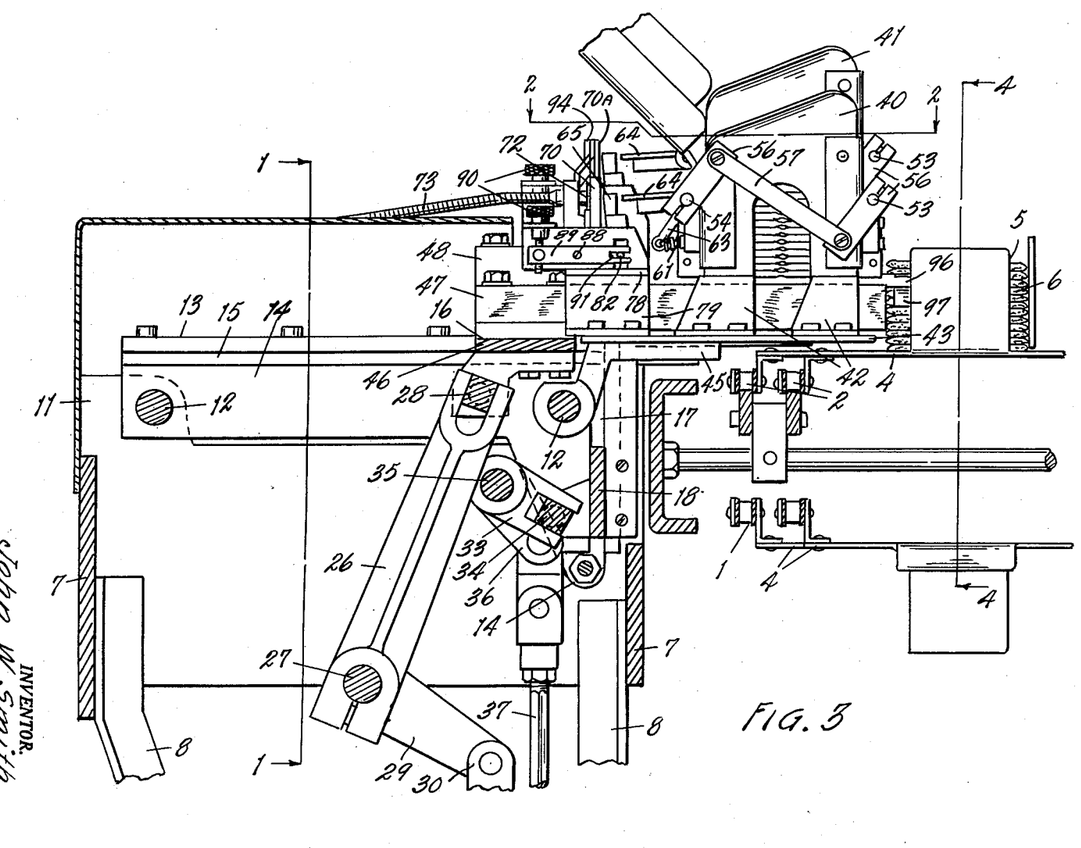
Fig. 3 is an end elevational view of my loading mechanism viewed from the entrance end of the conveyer and with portions of the conveyer and loader reciprocating mechanism broken away in transverse vertical cross section.

The transversely reciprocable slide assembly 16 includes the longitudinally extending support 46 which slides along the carriage 13 and upon which are mounted the primary loading bar 47 and the secondary loading bar 48. The loading bars 47 and 48 are arranged vertically to slide closely but freely over the surfaces of the two carriage plates 43 and 44 respectively and in their advanced position, as illustrated in Fig. 3, are operative to push a charge of crackers from underneath the loading chutes off of the carriage plates and into pockets of the conveyer 1. The secondary carriage plate and loading bar are elevated so that the charge of crackers deposited by the secondary loading bar will be positioned on top of an initial charge previously deposited in the pocket by the primary loading bar.

The descent of the stacks of crackers in the charging chutes 40 and 41 is controlled by pairs of elevator fingers 49 which are directly connected by means of the uprights 50 to the elevator slide 18 on the carriage. The carriage plates 43 and 44 are slotted as at 51 to pass the elevator fingers, and the loading bars 47 and 48 are similarly slotted as at 52. As is described in detail in my above mentioned application the elevator slide 18 and fingers 49 are reciprocated vertically in timed relationship with the loading bars and carriage to ascend to the bottom of the stack of crackers 5 and support the stack of crackers while the loading bars are being retracted from the conveyer and while the carriage is being retracted toward the entrance end of the conveyer to register with an incoming empty pocket of the conveyer. After the loading bars are fully retracted the elevator slide 18 and fingers 49 descend to gently lower the stacks of crackers 5 to the level of the carriage plates 43 and 44.

Figure 2:
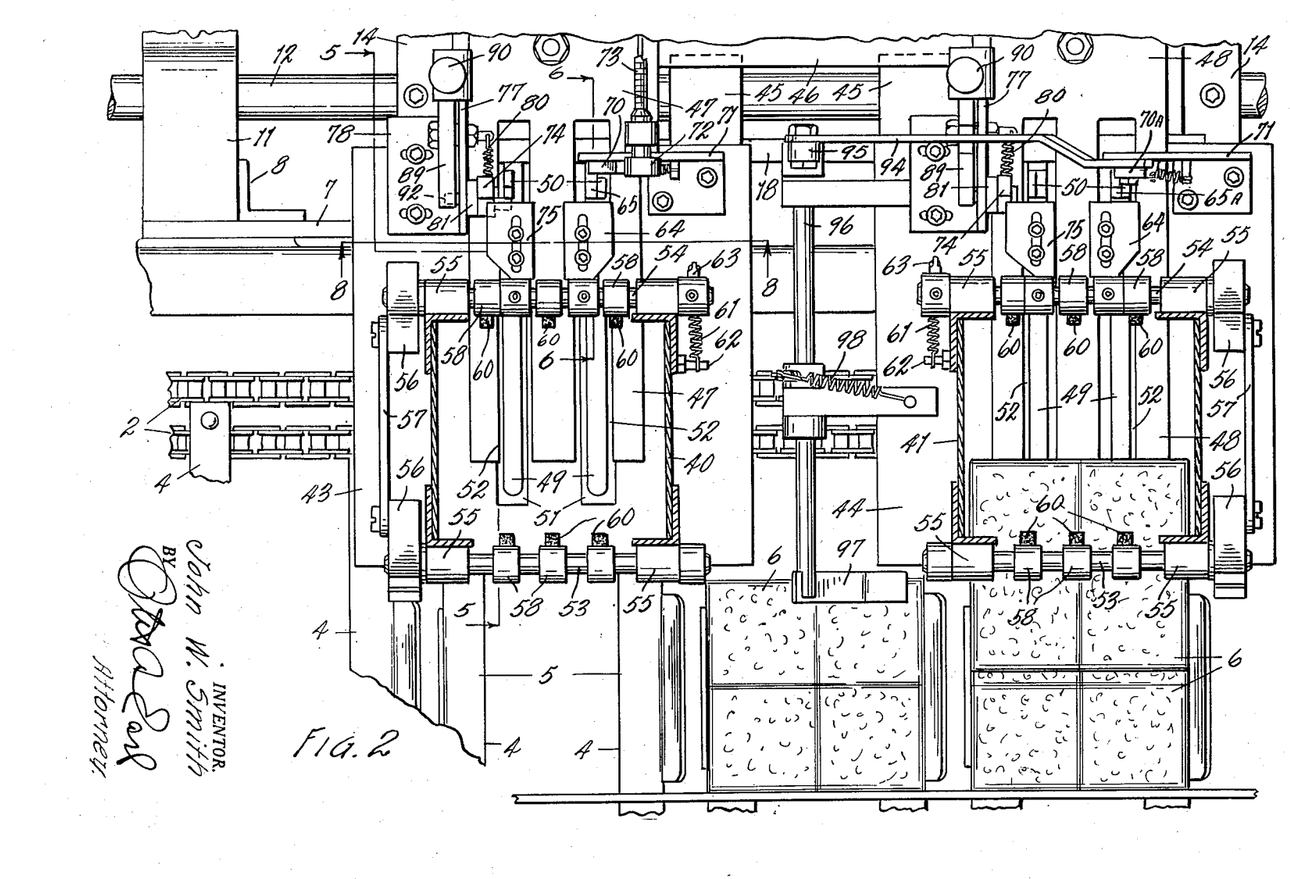
Fig. 2 is a fragmentary plan view of my loading mechanism partially broken away in horizontal cross section along the plane of the line 2—2 in Figs. 1 and 3.

In order to determine the number of crackers which will be loaded transversely by the loading bars 47 and 48, each of the charging chutes 40 and 41 is provided with a forward gripper shaft 53 and a rear gripper shaft 54. The shafts 53 and 54 are journalled in suitable bearings 55 secured to the walls of the charging chutes and the front and rear shafts of each chute are interconnected by the crank arms 56 and link 57 for simultaneous and opposite rotation. Each of the gripper shafts 53 and 54 is provided with three depending arms 58 having the vertically adjustable grippers 59 mounted on the lower ends thereof. The grippers 59 are provided with soft deformable gripping teeth 60 of sponge rubber or some similar substance and the gripping teeth of the front and rear grippers are opposed as illustrated to engage the front and rear edges of crackers in the charging chutes. Springs 61 (see Figs. 2 and 3) are connected between fixed pins 62 on the charging chutes and pins 63 extending from the rear gripper shafts to constantly bias the gripper shafts and gripper teeth 60 inwardly into gripping engagement with the crackers 6.

The gripper shafts and gripper teeth are moved outwardly away from the crackers in timed relationship with the upward motion of the elevator fingers 49 and uprights 50 by means of the opening plates 64 secured to and projecting rearwardly from each of the rear gripper shafts 54. One of the elevator uprights 50 associated with the primary charging chute carries at its upper end a grip opening pawl 65 which is pivoted to the upright at 66 (see Fig. 6). The pawl 66 is constantly urged forwardly by the spring 67 to be in position to engage the underside of the opening plate 64 and move the grippers to open position at the extreme upper limit of motion of the upright 50. A lockout finger 68 on the opening pawl projects rearwardly to engage the cam surface 69 on a lockout lever 70 when it is desired to de-actuate the opening pawl. The lockout lever 70 is pivotally supported on a bracket 71 carried on the carriage plate 43 and arranged to be selectively swung into or out of operative engagement with the lockout finger by means of the rotatable cam 72 remotely controlled by the flexible cable 73.

Figure 5:
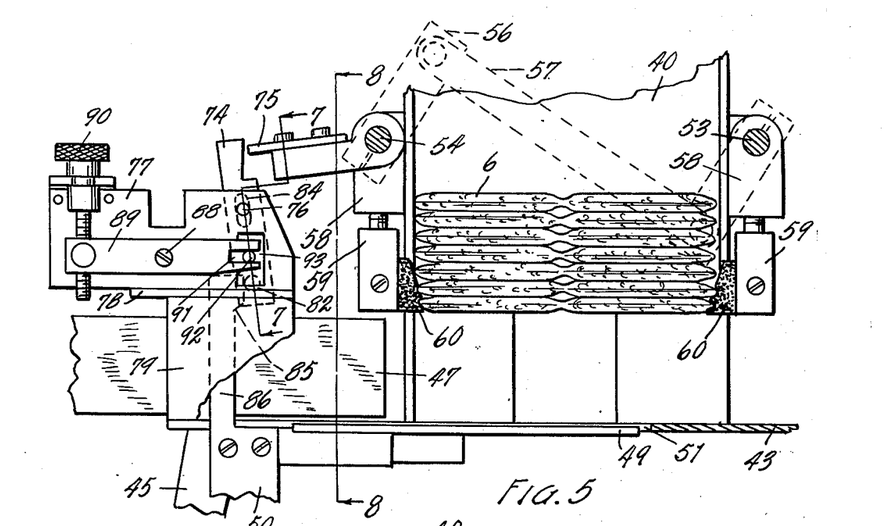
Fig. 5 is an enlarged fragmentary vertical cross sectional view through one of the loading positions of my machine taken along the plane of the line 5—5 in Figs. 2 and 4.
Figures 6, 7:
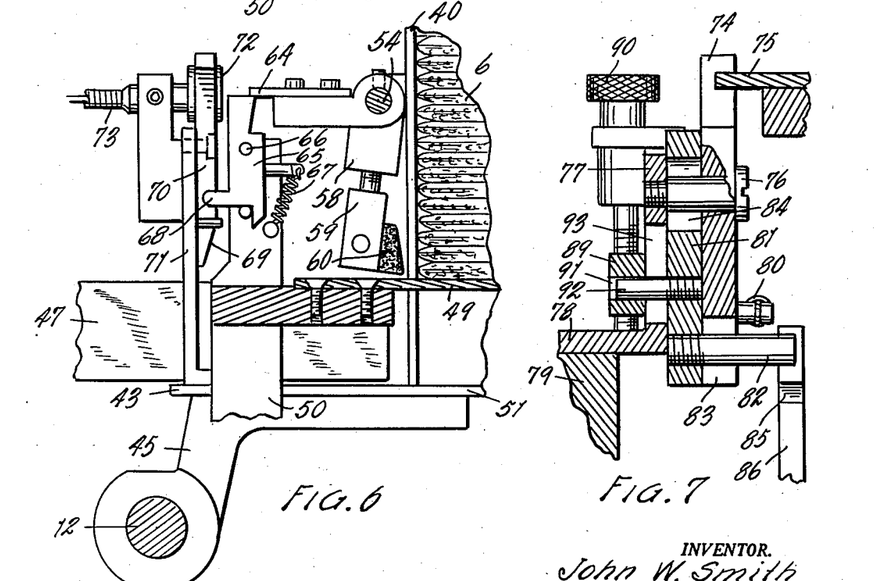
Fig. 6 is an enlarged fragmentary vertical cross sectional view taken along the plane of the line 6—6 in Fig. 2 and illustrating the grip holding mechanism of the first loading position.
Fig. 7 is an enlarged vertical cross sectional view through the grip releasing and adjusting mechanism of my machine taken along the plane of the broken line 7—7 in Fig. 5.
Figure 8:
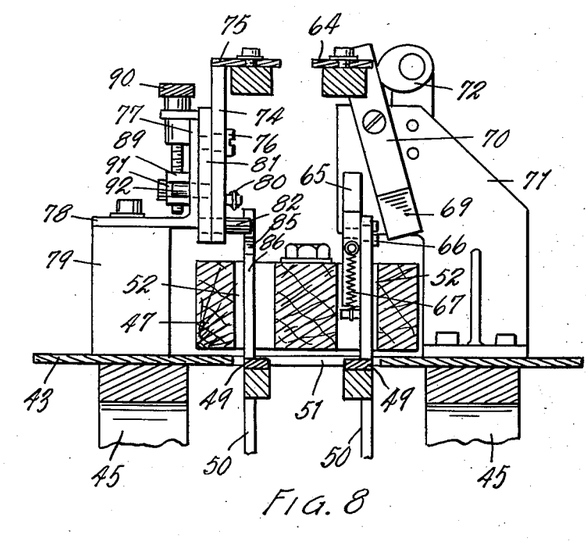
Fig. 8 is a fragmentary vertical cross sectional view taken along the plane of the line 8—8 in Figs. 2 and 5.

After the grippers on the primary charging chute have been opened by actuation of the plate 64, as described above, they are held in open position by engagement of a releasing pawl 74 with the release plate 75 (see Figs. 5, 7 and 8). The release plate 75 is secured to the rear gripper shaft in much the same manner as the opening plate 64 and is swung upwardly into position to be engaged by the release pawl concurrently with upward motion of the opening plate. The release pawl 74, as it most clearly illustrated in Figs. 5, 7 and 8, is pivotally supported on the shank of a pivot screw 76 engaged with the upright flange 77 of an angle shaped support bracket 78. The bracket 78 is in turn supported by the block 79 on the primary carriage plate 43. A spring 80 connected between the release pawl and a fixed point on the flange 77 constantly urges the release pawl into holding engagement with the release plate 75.

Slidably disposed between the release pawl 74 and the upright flange 77 of the support bracket is a release operating arm 81 having the release pin 82 projecting laterally from its lower end through a slot 83 in the lower end of the release pawl. The release operating arm 81 in turn defines a vertical slot 84 embracing the shank of the pivot pin 76 so that the release operating arm and release pin may be moved vertically with respect to the release pawl whose vertical position is fixed and determined by the pin 76. The release pin 82 projects beyond the release pawl and is arranged to be engaged by the cam surface 85 formed on the upper end of the release upright 86. The upright 86 is formed as a continuation of one of the elevator uprights 50 associated with the first charging chute.

In elevated position of the release upright 86 the cam surface 85 will clear the release pin 82 permitting the spring 80 to hold the release pawl in locking engagement with the plate 75. As the elevator and release upright 86 descend, the cam surface will engage the release pin 82 and pivot both the release operating arm 81 and release pawl 74 to disengage the release pawl from the plate and permit the grippers to close. Depending upon the adjustment of the grippers 59 on the gripper arms 58 and the vertical adjustment of the release pin 82, the elevator fingers 49 will have lowered a predetermined number of crackers below the gripper teeth 60 so that when the grippers close, a predetermined charge of crackers will remain on the elevator fingers below the gripper teeth to be acted upon by the loading bar 47. In operating the loading machine it is contemplated that the gripping teeth and release mechanism will be adjusted to release the grippers prior to the elevator reaching its lower limit of travel whereby the charge of crackers remaining on the elevator will be lowered a short distance below those crackers retained in the chute. Thus there is no rubbing between the surfaces of the crackers as the charge is slid from the chute onto the conveyor.

While vertical adjustment of the gripper arms 59 will effect a general and approximate count of the number of crackers which will be loaded with each charge this adjustment cannot be accomplished while the machine is in operation. In order to accomplish adjustment of the charge while the machine is operating, as when the crackers being supplied to the chute become thinner or thicker, I have provided for vertical adjustment of the release operating arm 81 and release pin 82. Pivotally secured at 88 on the vertical flange 77 is a release adjusting arm 89 having the adjusting screw 90 connected to its rear end and rotatable in an ear on the flange 77. The forward end of the release adjusting arm is slotted as at 91 to receive the release adjusting pin 92 carried by the release operating arm 81. The pin 92 projects through a slot 93 in the flange 77 and so can be moved vertically by the release adjusting arm to vary the vertical position of the arm 81 and pin 82. By lowering the adjusting pin 92 and releasing pin 82, the cam surface 85 may be made to actuate the release mechanism later in the downward movement of the elevator thus permitting an additional cracker to clear the gripping teeth 60 before the grippers are closed. A reverse adjustment of the pin 92 obviously releases the grippers sooner and reduces a number of crackers released to the elevator.

The gripping and releasing mechanism associated with the secondary charging chute 41 is essentially the same as that just described in connection with the primary charging chute. The rear gripper shaft 54 is provided with a similar opening plate 64 and release plate 75 and a release adjusting arm 89 and associated mechanism is arranged to cooperate with the release plate 75. However, the lockout lever 70A associated with the opening pawl 65A is connected by means of a link 94 (see Figs. 1, 2 and 4) with a crank arm 95 mounted on the interlocking shaft 96 which extends transversely of the loading machine between the charging hoppers. The forward end of the interlocking shaft is provided with a depending finger 97 and the shaft and finger are constantly urged downwardly by the spring 98. The finger 97 overlies the edge of the conveyer and will ride up and over the initial charge of crackers deposited in each pocket by the primary charging chute and loading bar. So long as the finger 97 is raised by a charge of crackers the shaft 96 and link 94 will rotate the lockout arm 70A out of engagement with the opening pawl 65A and the secondary charging chute and loading bar will function to add a secondary charge of crackers to each pocket. However, should the primary loading bar fail to function, for some reason, the finger 97 will remain down and the lockout arm 70A will tilt the opening pawl 65A out of operative engagement with the opening plate of the secondary gripper shafts and no crackers will be released to the secondary elevator.

Having thus described my invention, what I claim as new and desire to secure by Letters Patent is:

1. In combination with a longitudinally reciprocable carriage having a transversely reciprocable slide and vertically reciprocable elevator for loading articles on a conveyer positioned alongside of said carriage, mechanism for determining the number of articles released to said elevator and slide comprising, primary and secondary carriage plates mounted in horizontal longitudinally spaced relation on said carriage with the secondary plate disposed vertically above said primary plate, loading bars movable with said slide and disposed over said plates, primary and secondary charging chutes carried by said plates over said loading bars, elevator fingers reciprocable with said elevator and movable in the bottoms of said chutes down to the level of said plates, horizontal gripper shafts mounted on the front and rear of said chutes and having depending gripper arms adjustably secured thereto, spring means biasing said gripper shafts to rotate said gripper arms inwardly of said chutes, said arms having soft deformable gripper teeth on their lower ends, opening plates secured to the rear gripper shafts, opening pawls carried by elevator fingers associated with each of said chutes and engageable with said opening plates to rotate said gripper shafts and arms out of said chutes, releasing pawls pivotally mounted at fixed points above said carriage plates adjacent to said rear gripper shafts, releasing plates secured to said rear gripper shafts, spring means biasing said release pawls into locking engagement with said release plates to hold said shafts in gripper opening position, a release operating arm pivotally and vertically adjustably mounted with respect to each of said release pawls, means including screw adjusted levers for vertically adjusting said operating arms, a release pin carried by each of said release arms and laterally engageable with said release pawls, release uprights connected to elevator fingers associated with each of said chutes and having cam surfaces engageable with said release pins to move said release arms and release pawls to releasing position, lockout levers associated with each of said loading chutes and having cam surfaces swingable into the path of travel of the opening pawls of each chute to move said pawls out of operative engagement with said opening plates, remotely controllable means for actuating the lockout lever associated with the primary loading chute, and interlocking means including a pivoted finger actuatable by the presence or absence of a primary charge in the pocket of the conveyer moving away from said primary chute, said interlocking means being connected to actuate the lockout lever associated with said second charging chute to prevent opening of the grippers on said second chute if there is no primary charge in the pocket approaching said secondary chute.

2. In combination with a longitudinally reciprocable carriage having a transversely reciprocable slide and vertically reciprocable elevator for loading articles on a conveyor extending longitudinally alongside of said carriage, mechanism for determining the number of articles released to said elevator and slide comprising, primary and secondary supports mounted on said carriage with the secondary support disposed vertically above the level of said primary support and spaced longitudinally therefrom toward the discharge end of the conveyor, loading bars movable with said slide and disposed in longitudinally and vertically relation adjacent to said supports, primary and secondary charging chutes carried by said supports over said loading bars, elevator fingers reciprocable with said elevator and movable within the bottom of said chutes to the levels of the bottoms of said bars, horizontal gripper shafts mounted on opposite sides of said chutes and having depending gripper arms adjustably secured thereto, spring means biasing said gripper shafts to rotate said gripper arms inwardly of said chutes, said arms having soft deformable gripper portions on their free ends, opening plates secured to gripper shafts associated with each of said chutes, opening pawls carried by elevator fingers associated with each of said chutes and engageable with said opening plates to rotate said gripper shafts and arms outwardly of said chutes at the upper limit of travel of said fingers, releasing pawls pivotally mounted at fixed points on said supports, release plates secured to gripper shafts associated with each chute, means biasing said release pawls toward locking engagement with said release plates, release operating arms pivotally mounted on said supports and vertically adjustable with respect to each of said release pawls, means for selectively adjusting said release operating arms vertically, a release pin carried by each of said release arms and laterally engageable with the release pawl associated with its release arm, release uprights connected to elevator fingers associated with each of said chutes and having cam surfaces engageable with said release pins to move said release arms and release pawls to releasing position by downward movement of said elevator, lockout levers associated with said loading chutes and having cam surfaces swingable into engagement with the opening pawl of each chute to move said opening pawls out of operative engagement with said opening plates, remotely controllable means for actuating the lockout lever associated with the primary loading chute, and interlocking means including a finger actuated by the presence or absence of a primary charge in the pocket of the conveyor moving away from said primary chute, said interlocking means being connected to actuate the lockout lever associated with said second charging chute to move the opening pawl of said second chute to inoperative position.

3. In combination with a longitudinally reciprocable carriage having a transversely reciprocable slide and vertically reciprocable elevator for loading articles on a conveyer extending longitudinally alongside of said carriage, mechanism for determining the number of articles released to said elevator and slide comprising, primary and secondary supports mounted on said carriage with the secondary support disposed vertically above the level of said primary support and spaced longitudinally therefrom toward the discharge end of the conveyer, loading bars movable with said slide and disposed in longitudinally and vertically spaced relation adjacent to said supports, primary and secondary charging chutes carried by said supports over said loading bars, elevator fingers reciprocable with said elevator and movable within the bottoms of said chutes to the levels of the bottoms of said bars, horizontal gripper shafts mounted on opposite sides of said chutes and having gripper arms secured thereto, spring means biasing said gripper shafts to rotate said gripper arms inwardly of said chutes, said arms having gripper portions on their free ends, opening plates secured to gripper shafts associated with each of said chutes, opening pawls carried by elevator fingers associated with each of said chutes and engageable with said opening plates to rotate said gripper shafts and arms outwardly of said chutes at the upper limit of travel of said fingers, releasing pawls pivotally mounted at fixed points on said supports, release plates secured to gripper shafts associated with each chute, means biasing said release pawls toward locking engagement with said release plates, release operating arms pivotally mounted on said supports and vertically adjustable with respect to each of said release pawls, means for selectively adjusting said release operating arms vertically, a release pin carried by each of said release arms and laterally engageable with the release pawl associated with its release arm, release uprights connected to elevator fingers associated with each of said chutes and having cam surfaces engageable with said release pins to move said release arms and release pawls to releasing position by downward movement of said elevator, lockout levers associated with said loading chutes and having cam surfaces swingable into engagement with the opening pawl of each chute to move said opening pawls out of operative engagement with said opening plates, manually operated means for actuating the lockout lever associated with the primary loading chute, and interlocking means including a finger actuated by the presence or absence of a primary charge in the pocket of the conveyer moving away from said primary chute, said interlocking means being connected to actuate the lockout lever associated with said second charging chute to move the opening pawl of said second chute to inoperative position.

4. In combination with a longitudinally reciprocable carriage having a transversely reciprocable slide and vertically reciprocable elevator for loading articles on a conveyer extending longitudinally alongside of said carriage, mechanism for determining the number of articles released to said elevator and slide comprising, longitudinally spaced loading bars movable transversely of said slide toward and away from said conveyer, the second of said bars along the path of said conveyer being elevated above the level of the first bar, primary and secondary charging chutes carried by said carriage over said loading bars and adapted to receive a supply of flat articles to be loaded, elevator fingers reciprocable with said elevator and movable within the bottoms of said chutes to the level of the bottoms of said bars, gripper shafts mounted on opposite walls of said chutes and having gripper arms projecting from the axes of the shafts, means biasing said gripper shafts to rotate said gripper arms inwardly of said chutes, said arms having gripper portions on their swinging ends, plates projecting from one of the gripper shafts associated with each of said chutes, opening pawls carried by elevator fingers associated with said chutes and engageable with said plates to rotate said gripper shafts and arms out of said chutes, releasing pawls pivotally mounted at fixed points relative to said carriage and swingable into holding engagement with said plates, means biasing said release pawls toward holding engagement with said plates, release operating arms pivotally mounted with respect to each of said release pawls, release pins carried by said release arms and laterally engageable with said release pawls to effect concurrent pivotal motion of said release operating arms and pins, release uprights connected to elevator fingers associated with said chutes and having cam surfaces engageable with said release pins to move said operating arms and release pawls to releasing position, lockout levers associated with said loading chutes and having cam surfaces swingable into the paths of travel of the opening pawl associated with each chute to move said pawls out of operative engagement with said plates, manually controllable means for actuating the lockout lever associated with the primary loading chute, and interlocking means including a finger actuated by the presence or absence of a primary charge in the pocket of the conveyer moving away from said primary chute, said interlocking means being connected to actuate the lockout lever associated with said second charging chute.

5. In a machine for loading crackers on the pockets of a continuously moving conveyer, the combination with a carriage longitudinally reciprocable alongside said conveyer and a loading slide transversely reciprocable across said carriage to said conveyer and an elevator vertically reciprocable on said carriage comprising, a chute supported on said carriage over the path of said slide and adapted to advance a stack of crackers toward said slide, gripper members oscillatably mounted on opposite sides of said chute and having soft deformable teeth swingable into said chute to grip the crackers therein at a point above said slide, means for biasing said members to gripping position, a gripper opening element reciprocably carried by said elevator and engageable with a portion of said gripper members near the upper limit of travel of said elevator to oscillate said gripper members to opening position, a pivoted holding element mounted on a fixed point on said carriage and spring biased to swing into holding engagement with a portion of said gripper members when said members are opened, a releasing element pivotally and slidably mounted on said carriage and having a release pin laterally and slidably engageable with said holding element, a trip member vertically reciprocable with said elevator and having a cam surface engageable with said pin near the lower limit of travel of said elevator to move said pin, said release arm and said holding element out of holding engagement with said gripper members, and screw means mounted on said carriage for vertically adjusting said release element whereby the point at which said trip member will engage said pin may be varied.

6. In a machine for loading crackers on the pockets of a continuously moving conveyer, the combination with a carriage longitudinally reciprocable alongside said conveyer and a loading slide transversely reciprocable across said carriage to said conveyer and an elevator vertically reciprocable on said carriage comprising, a chute supported on said carriage over the path of said slide and adapted to advance a stack of crackers toward said slide, gripper members oscillatably mounted on opposite sides of said chute and having teeth swingable into said chute to grip the crackers therein at a point above said slide, means for biasing said members to gripping position, a gripper opening element reciprocably carried by said elevator and engageable with a portion of said gripper members near the upper limit of travel of said elevator to oscillate said gripper members to opening position, a pivoted holding element mounted on a fixed point on said carriage and biased to swing into holding engagement with a portion of said gripper members when said members are opened, a releasing element pivotally and slidably mounted on said carriage and having a release pin laterally and slidably engageable with said holding element, a trip member vertically reciprocable with said elevator and having a surface engageable with said pin near the lower limit of travel of said elevator to move said pin, said release arm and said holding element out of holding engagement with said gripper members, and means mounted on said carriage for vertically adjusting said release element whereby the point at which said trip member will engage said pin may be varied.

7. In a cracker loading machine, the combination with a continuously movable conveyer having pockets thereon which comprises, a carriage reciprocable in timed relationship with said conveyer, primary and secondary loading chutes supported on said carriage and disposed longitudinally along said conveyer, primary and secondary loading bars on said carriage transversely reciprocable through the bottoms of said primary and secondary chutes respectively, said secondary loading bar being elevated above the level of said primary bar, an elevator reciprocable on said carriage in timed relationship with said loading bars and having elevator fingers positioned to reciprocate within said chutes to the levels of the loading bars therein, opposed gripper elements oscillatably mounted on said chutes and having deformable gripping teeth swingable into and out of gripping position within said chutes, opening elements reciprocable with said elevator and engageable at their upper limit of travel with portions of said gripper elements to move said gripper elements and teeth out of gripping position, holding latches on said carriage spring biased into holding engagement with said gripper elements when said gripper elements are opened, release elements reciprocably carried by said elevator, actuating members carried by said carriage and having portions engageable with said latches and said release elements to unlatch said latches when said actuating members are engaged with said release elements, and means for independently adjusting the positions of said actuating members along the paths of travel of said release elements to vary the points of release of said latches in the descending cycle of said elevator.

8. In an article loading machine, the combination with a continuously movable conveyer having pockets thereon which comprises, a carriage reciprocable in timed relationship with said conveyer, primary and secondary loading chutes supported on said carriage and disposed longitudinally along said conveyer, primary and secondary loading bars on said carriage transversely reciprocable through the bottoms of said primary and secondary chutes respectively, said secondary loading bar being elevated above the level of said primary bar, an elevator reciprocable on said carriage in timed relationship with said loading bars and having elevator fingers positioned to reciprocate within said chutes to the levels of the loading bars therein, opposed gripper elements oscillatably mounted on said chutes and having gripping teeth swingable into and out of gripping position within said chutes, opening elements reciprocable with said elevator and engageable at their upper limit of travel with portions of said gripper elements to move said gripper elements and teeth out of gripping position, holding latches on said carriage, means for moving said latches into holding engagement with said gripper elements when said gripper elements are opened, release elements reciprocably carried by said elevator, actuating members carried by said carriage and having portions engageable with said latches and said release elements to unlatch said latches when said actuating members are engaged with said release elements, and means for adjusting the positions of said actuating members along the paths of travel of said release elements to vary the points of release of said latches in the descending cycle of said elevator.

9. In an article loading machine, the combination with a continuously movable conveyer having pockets thereon which comprises, a carriage reciprocable in timed relationship with said conveyer, a loading chute supported on said carriage, a loading bar on said carriage transversely reciprocable through the bottom of said chute, an elevator reciprocable on said carriage in timed relationship with said loading bar and positioned to reciprocate within said chute to the level of said loading bar, opposed gripper elements oscillatably mounted on said chute and having gripping teeth swingable into and out of gripping position within said chute, an opening element reciprocable with said elevator and engageable at its upper limit of travel with one of said gripper elements to move said gripper elements and teeth out of gripping position, a holding latch on said carriage, means for moving said latch into holding engagement with said one of gripper elements when said gripper elements are opened, a release element reciprocably carried by said elevator, an actuating member carried by said carriage and having portions engageable with said latch and said release element to unlatch said latch when said actuating member is engaged with said release element, and means for adjusting the position of said actuating member along the path of travel of said release element to vary the point of release of said latch in the descending cycle of said elevator.

10. In an article loading machine, the combination with a continuously movable conveyer having pockets thereon which comprises, a carriage reciprocable in timed relationship with said conveyer, a loading chute supported on said carriage, a loading bar on said carriage transversely reciprocable through the bottom of said chute, an elevator reciprocable on said carriage in timed relationship with said loading bar and positioned to reciprocate within said chute to the level of said loading bar, opposed gripper elements oscillatably mounted on said chute and having gripping teeth swingable into and out of gripping position within said chute, an opening element reciprocable with said elevator and engageable at its upper limit of travel with one of said gripper elements to move said gripper elements and teeth out of gripping position, a holding latch on said carriage, means for moving said latch into holding engagement with said one of gripper elements when said gripper elements are opened, a release element reciprocably carried by said elevator, and an actuating member carried by said carriage and having portions engageable with said latch and said release element to unlatch said latch when said actuating member is engaged with said release element in the descending cycle of said elevator.

11. In a machine for loading crackers and the like into the pockets of a continuously movable conveyer, the combination comprising, a carriage reciprocable in timed relationship with said conveyer, a slide on said carriage transversely reciprocable in timed relationship therewith, an elevator on said carriage vertically reciprocable in timed relationship therewith, a feed chute on said carriage positioned over the path of travel of said slide and adapted to feed crackers to said slide, an article supporting finger connected to said elevator and vertically reciprocable in said chute to lower the articles thereinto in front of said slide, gripper elements including soft deformable teeth oscillatably mounted on said chute above the upper limit of movement of said elevator finger for motion into and out of gripping engagement with articles in said chute, opening means on said carriage actuated by one of said timed elements and connectable with said gripper elements to open said gripper elements when said finger approaches the upper limit of its travel, a latch for holding said gripper elements in open position, a latch trip member on said carriage arranged to be engaged and actuated by one of said timed elements to trip said latch member and release said gripper element prior to the elevator reaching its lower limit of travel, and means for adjusting said latch trip member with respect to its actuating element to vary the time of release of said latch in the cycle of said elevator.

12. In a machine for loading crackers and the like, the combination comprising, a support, a slide on said support transversely reciprocable thereon, an elevator on said support vertically reciprocable thereon, a feed chute on said support positioned over the path of travel of said slide and adapted to feed crackers to said slide, an article supporting finger connected to said elevator and vertically reciprocable in said chute to lower the articles thereinto in front of said slide, gripper elements including teeth oscillatably mounted on said chute above the upper limit of movement of said elevator finger for motion into and out of gripping engagement with articles in said chute, opening means on said support actuated by one of said timed elements and connectable with said gripper elements to open said gripper elements when said finger approaches the upper limit of its travel, a latch for holding said gripper elements in open position, a latch trip member on said support arranged to be engaged and actuated by one of said timed elements to trip said latch member and release said gripper element prior to the elevator reaching its lower limit of travel, and means for adjusting said latch trip member with respect to its actuating element to vary the time of release of said latch in the cycle of said elevator.

13. In a machine for loading articles into the pockets of a continuously movable conveyer, the combination comprising, a carriage reciprocable in timed relationship with said conveyer, a slide on said carriage transversely reciprocable in timed relationship therewith, an elevator on said carriage vertically reciprocable in timed relationship therewith, a feed chute on said carriage positioned over the path of travel of said slide and adapted to feed crackers to said slide, an article supporting finger connected to said elevator and vertically reciprocable in said chute to lower the articles thereinto in front of said slide, gripper elements oscillatably mounted on said chute above said elevator finger for motion into and out of gripping engagement with articles in said chute, means for closing said gripper elements into gripping position, opening means on said carriage actuated by one of said timed elements and operable to open said gripper elements when said finger approaches the upper limit of its travel, a latch for holding said gripper elements in open position, a latch trip member on said carriage arranged to be actuated by one of said timed elements to trip said latch member and release said gripper elements prior to the elevator reaching its lower limit of travel, and means for adjusting the relative positions of said latch trip member and its actuating element to vary the time of release of said latch in the cycle of said elevator.

14. In a machine for loading articles into the pockets of a continuously movable conveyer, the combination comprising, a carriage reciprocable in timed relationship with said conveyer, a slide on said carriage transversely reciprocable in timed relationship therewith, an elevator on said carriage vertically reciprocable in timed relationship therewith, a feed chute on said carriage positioned over the path of travel of said slide and adapted to feed crackers to said slide, an article supporting finger connected to said elevator and vertically reciprocable in said chute to lower the articles thereinto in front of said slide, gripper elements oscillatably mounted on said chute above said elevator finger for motion into and out of gripping engagement with articles in said chute, means for closing said gripper elements into gripping position, opening means on said carriage actuated by one of said timed elements and operable to open said gripper elements when said finger approaches the upper limit of its travel, a latch for holding said gripper elements in open position, and a latch trip member on said carriage arranged to be actuated by one of said timed elements to trip said latch member and release said gripper elements prior to the elevator reaching its lower limit of travel.

15. In a machine for loading articles, the combination comprising, a support, a timed slide transversely reciprocable on said support, an elevator vertically reciprocable on said support in timed relationship with said slide, a feed chute on said support positioned over the path of travel of said slide and adapted to feed crackers to said slide, an article supporting finger connected to said elevator and vertically reciprocable in said chute to lower the articles thereinto in front of said slide, an article gripper element mounted on said chute above said elevator finger for motion into and out of gripping engagement with an article to support said article and articles thereabove in said chute, opening means on said support actuated by one of said timed elements and operable to open said gripper element when said finger is near the upper limit of its travel, a latch for holding said gripper element in open position, and a latch trip member on said support arranged to be actuated by one of said timed elements to trip said latch member and release said gripper element prior to the elevator reaching its lower limit of travel.

16. In a machine for loading articles, the combination comprising, a support, a timed loading slide transversely reciprocable across said support, an elevator vertically reciprocable on said support in timed relationship with said slide, a chute on said support over the path of said slide and adapted to advance a stack of articles toward said slide, means on said elevator positioned to move and support articles in said chute, a gripper mounted on said support and swingable into said chute to grip an article therein at a point above said elevator, means for biasing said gripper to closed gripping position, means carried by said support and operable by one of said timed elements near the upper limit of travel of said elevator to move said gripper to opening position, holding means mounted on said support and biased to swing into holding engagement with a portion of said gripper when said gripper is opened, a releasing element movably mounted on said support and engageable with said holding means, means operable in timed relationship with one of said timed elements and engageable with said releasing element near the lower limit of travel of said elevator to move said releasing element to move said holding means to close said gripper, and means mounted on said support for adjusting the relative positions of said releasing element and holding means whereby the point at which said gripper will be closed may be varied.

17. In a machine for loading articles, the combination comprising, a support, a timed loading slide transversely reciprocable across said support, an elevator vertically reciprocable on said support in timed relationship with said slide, a chute on said support over the path of said slide and adapted to advance a stack of articles toward said slide, means on said elevator positioned to move and support articles in said chute, a gripper mounted on said support and swingable into said chute to grip an article at a point above said elevator, means carried by said support and operable by one of said timed elements near the upper limit of travel of said elevator to move said gripper to opening position, and means operable in timed relationship with one of said timed elements near the lower limit of travel of said elevator to close said gripper.

JOHN W. SMITH.

No references cited.